(12) United States Patent
Heo

(10) Patent No.: US 7,586,658 B2
(45) Date of Patent: Sep. 8, 2009

(54) METHOD AND APPARATUS FOR REMOVING COLOR NOISE IN IMAGE SIGNAL

(75) Inventor: Jae-Sung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 11/710,781

(22) Filed: Feb. 26, 2007

(65) Prior Publication Data
US 2007/0201064 A1 Aug. 30, 2007

(30) Foreign Application Priority Data
Feb. 28, 2006 (KR) .................. 10-2006-0019568

(51) Int. Cl.
G03F 3/08 (2006.01)
H04N 1/46 (2006.01)
G06K 9/40 (2006.01)
H04N 9/68 (2006.01)

(52) U.S. Cl. .................. 358/520; 358/1.9; 358/518; 358/512; 358/525; 382/261; 382/263; 382/264; 382/272; 382/275; 348/234; 348/236

(58) Field of Classification Search .................. 358/520, 358/1.9, 518, 512, 525; 382/261, 263, 264, 382/272, 275; 348/234, 236
See application file for complete search history.

(56) References Cited

U.S. PATENT DOCUMENTS 6,577,756 B1 * 6/2003 Furui .................. 382/141

2002/0041331 A1 * 4/2002 Xiaomang et al. .......... 348/234
2003/0210256 A1 * 11/2003 Mori et al. .................. 345/690

OTHER PUBLICATIONS

Korean Patent Application No. 10-1996-027363 to Jung, having Publication date of Jun. 5, 1998 (w/ English Abstract page).
Korean Patent Application No. 1019950022312 to Lee, having Publication date of Apr. 13, 1999 (w/ English Abstract page).
Korean Patent Application No. 1019950024532 to Kang, having Publication date of May 13, 1999 (w/ English Abstract page).
Japanese Patent Application No. 2002-312445 to Tadashi, having Publication date of May 20, 2004 (w/ English Abstract page).
International Patent Application No. PCT/EP00/12925 to Tenze et al., having Publication date of Jul. 19, 2001 (w/ English Abstract page).
Korean Patent Application No. 1020000041114 to Hong, having Publication date of Feb. 22, 2002 (w/ English Abstract page).

* cited by examiner

Primary Examiner—Edward L Coles
Assistant Examiner—Charlotte M Baker
(74) Attorney, Agent, or Firm—Monica H. Choi

(57) ABSTRACT

In a method and apparatus for processing an image signal, luminance signals are generated for an object pixel and local pixels. A luminance dispersion value is then generated for the object pixel from the luminance signals of the object and local pixels. A control factor is determined from the luminance dispersion value, and at least one image signal of the object pixel is low-pass filtered according to the control factor.

20 Claims, 10 Drawing Sheets

| G | R | G | R | G |
|---|---|---|---|---|
| B | G | B1 | G | B |
| G | R1 | G1 | R2 | G |
| B | G | B2 | G | B |
| G | R | G | R | G |

(b)

| R | G | R | G | R |
|---|---|---|---|---|
| G | B1 | G1 | B4 | G |
| R | G3 | R1 | G4 | R |
| G | B2 | G2 | B3 | G |
| R | G | R | G | R |

(c)

| B | G | B | G | B |
|---|---|---|---|---|
| G | R1 | G1 | R4 | G |
| B | G3 | B1 | G4 | B |
| G | R2 | G2 | R3 | G |
| B | G | B | G | B |

| G |   | G |   | G |
|---|---|---|---|---|
|   | G |   | G |   |
| G |   | G |   | G |
|   | G |   | G |   |
| G |   | G |   | G |

(b)

| R |   | R |   | R |
|---|---|---|---|---|
|   |   |   |   |   |
| R |   | R |   | R |
|   |   |   |   |   |
| R |   | R |   | R |

(c)

| B |   | B |   | B |
|---|---|---|---|---|
|   |   |   |   |   |
| B |   | B |   | B |
|   |   |   |   |   |
| B |   | B |   | B |

METHOD AND APPARATUS FOR REMOVING COLOR NOISE IN IMAGE SIGNAL

This application claims priority under 35 USC §119 to Korean Patent Application No. 2006-19568, filed on Feb. 28, 2006 in the Korean Intellectual Property Office, the disclosure of which is incorporated herein in its entirety by reference.

BACKGROUND OF THE INVENTION

1. Field of the Invention

The present invention relates generally to removing color noise in an image signal, and more particularly, to performing different levels of low pass filtering on the image signal depending on whether an object pixel is in an even region, an intermediate region, or an edge region.

2. Background of the Invention

An image signal for an image is generated by photographing an object using a photographing device including an image sensor. The image signal is processed such as by being modulated and then transmitted to a display device through a wired or wireless channel. The display device restores the received image signal through further signal processing such as by demodulation and displays an image corresponding to the restored image signal.

FIG. 1 is a block diagram of an image signal processor (ISP) for processing an image signal generated by an image sensor 102. Referring to FIG. 1, the image signal processor includes a line memory controller 104, an interpolator 106, and a converter 108.

The image sensor 102 generates an image signal in a predetermined format from light Lin corresponding to an image. The image sensor 102 of FIG. 1 generates a Bayer color pattern signal having the Bayer color pattern format. The Bayer color pattern format is known to one of ordinary skill in the art. The line memory controller 104 aligns the Bayer pattern color signal from the image sensor 102 line by line to generate an M-line Bayer pattern color signal.

The interpolator 106 interpolates the M-line Bayer pattern color signal using correlation of signals corresponding to respective pixels to generate color component RGB (red, green, and blue) signals for each pixel. The converter 108 converts the RGB signals into final Y (luminance) and C (chrominance) signals. The Y and C signals are transmitted to a display device such as a TV set through a wired or wireless channel.

The image signal from the image sensor 102 may include color noise that may be mixed with an ideal image signal during image signal processing in FIG. 1. Various image signal processing techniques have been proposed to remove the color noise. However, conventional image signal processing techniques use uniform low pass filtering to remove the color noise without considering whether an image area is for an even region or an edge region.

When the image area is for an even region, the image signal has small variation in such an image area. When the image area is for an edge region, the image signal has large variation in such an image area. While low pass filtering for the even region removes the color noise, low pass filtering for the edge region may deteriorate the definition of the image.

SUMMARY OF THE INVENTION

Accordingly, the present invention performs selective low pass filtering depending on the type of image area as one of an even region, an intermediate region, or an edge region.

In a method and apparatus for processing an image signal according to an aspect of the present invention, luminance signals are generated for an object pixel and local pixels. A luminance dispersion value is then generated for the object pixel from the luminance signals of the object and local pixels. In addition, a control factor is determined from the luminance dispersion value. Furthermore, at least one image signal of the object pixel is low-pass filtered according to the control factor.

In an example embodiment of the present invention, the luminance dispersion value is determined as follows:

$$V(X) = \frac{1}{N}\sum_{i=1}^{N} |Xi - m|$$

with N being a total number of the object and local pixels, Xi being a respective luminance value for each of the object and local pixels, and m being a mean value of the respective luminance values for the object and local pixels.

In another embodiment of the present invention, the control factor is a first value if the luminance dispersion value is less than a first reference value, is a second value if the luminance dispersion value is greater than a second reference value, and varies linearly with the luminance dispersion value in a range of the first and second reference values.

In a further embodiment of the present invention, a plurality of original color component signals Ri, Gi, and Bi for the object pixel are low-pass filtered to generate output color component signals Ro, Go, and Bo according to the control factor K as follows:

$Ro=(Rm-Ri) \cdot K+Ri=Rm \cdot K+Ri \cdot (1-K)$;

$Go=(Gm-Gi) \cdot K+Gi=Gm \cdot K+Gi \cdot (1-K)$;

$Bo=(Bm-Bi) \cdot K+Bi=Bm \cdot K+Bi(1-K)$, with Rm, Gm, and Bm being mean color component signals for the object pixel.

In an example embodiment of the present invention, the plurality of original color component signals Ri, Gi, and Bi are generated from an interpolator that processes a Bayer color pattern signal. In addition, the plurality of the output color component signals Ro, Go, and Bo are used by a converter for generating final YC (luminance and chrominance) signals.

In a further embodiment of the present invention, a color pattern signal Ai for the object pixel is low-pass filtered to generate an output color pattern signal Ao according to the control factor K as follows:

$Ao=(Am-Ai) \cdot K+Ai=Am \cdot K+Ai \cdot (1-K)$ with Am being a mean color pattern signal for the object pixel.

In an example embodiment of the present invention, the color pattern signal Ai is a Bayer color pattern signal from a line memory controller, and the output color pattern signal Ao is used by an interpolator to generate color component signals for the object pixel.

In another embodiment of the present invention, color dispersion values are generated for the object pixel from color component signals of the object and local pixels. In that case, the control factor is determined depending on the luminance dispersion value and the color dispersion values. For example, the control factor is set to a by-pass value when all of the color dispersion values are less than the luminance dispersion value.

In an example embodiment of the present invention, the object pixel is disposed at a center of a local area of 5×5 pixels, and the local pixels are pixels surrounding the object pixel in the local area.

In this manner, color noise is removed with selective low-pass filtering for removing color noise with stronger low-pass filtering in more even regions and with less low-pass filtering in edge regions. Thus, high definition of the image at the edge regions is preserved despite color noise removal from the more even regions.

BRIEF DESCRIPTION OF THE DRAWINGS

The above and other features and advantages of the present invention will become more apparent when described in detailed exemplary embodiments thereof with reference to the attached drawings in which:

FIGS. 6(a), 6(b), and 6(c) illustrate example Bayer pattern color signals processed by the color noise removing apparatus of FIG. 5, according to an example embodiment of the present invention;

FIG. 7(a) illustrates G pixels used in determining a mean G signal when an object pixel is for a G signal, according to an example embodiment of the present invention;

FIG. 7(b) illustrates R pixels used in determining a mean R signal when an object pixel is for an R signal, according to an example embodiment of the present invention;

FIG. 7(c) illustrates B pixels used in determining a mean B signal when an object pixel is for a B signal, according to an example embodiment of the present invention;

The figures referred to herein are drawn for clarity of illustration and are not necessarily drawn to scale. Elements having the same reference number in FIGS. 1, 2A, 2B, 3A, 3B, 4, 5, 6(a), 6(b), 6(c), 7(a), 7(b), 7(c), 8, 9, and 10 refer to elements having similar structure and/or function.

DETAILED DESCRIPTION OF THE INVENTION

Figure 2A:
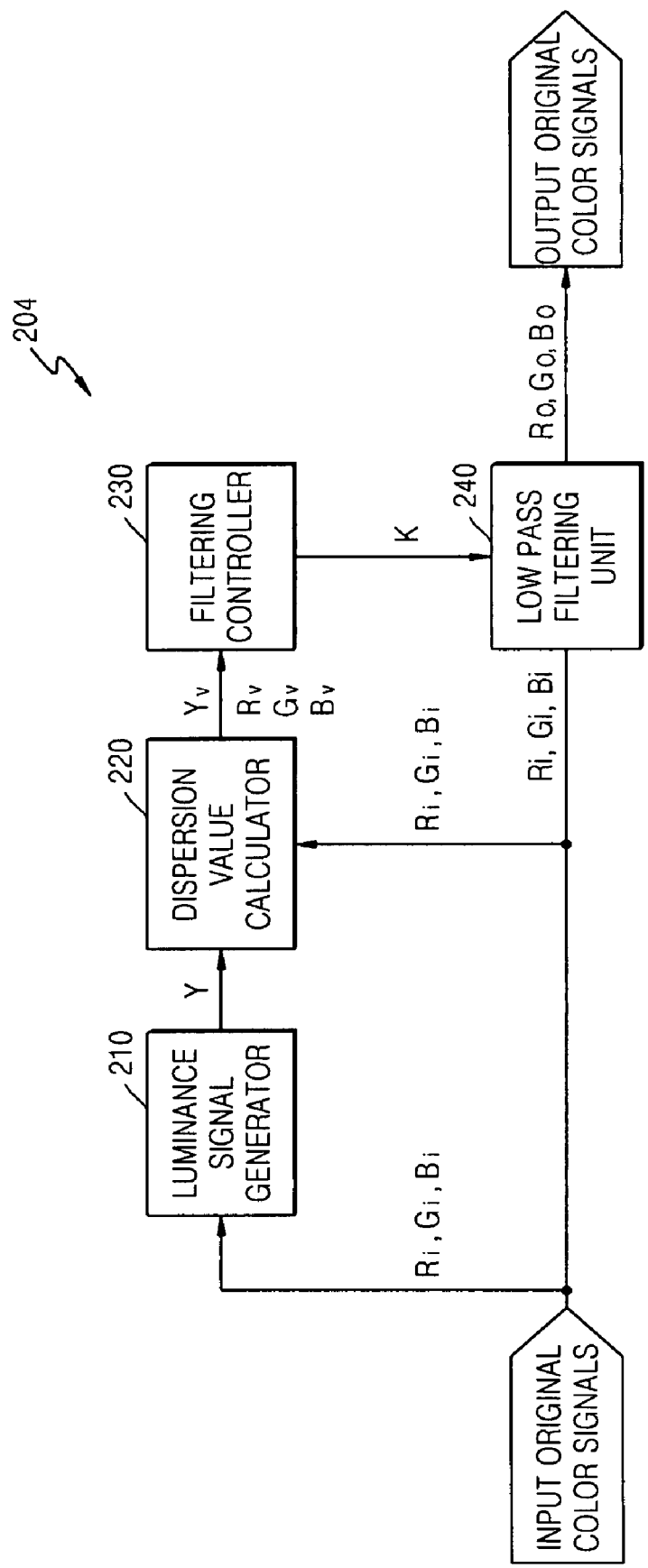
FIG. 2A is a block diagram of a color noise removing apparatus in an image signal processor of FIG. 9, according to an embodiment of the present invention.
Figure 9:
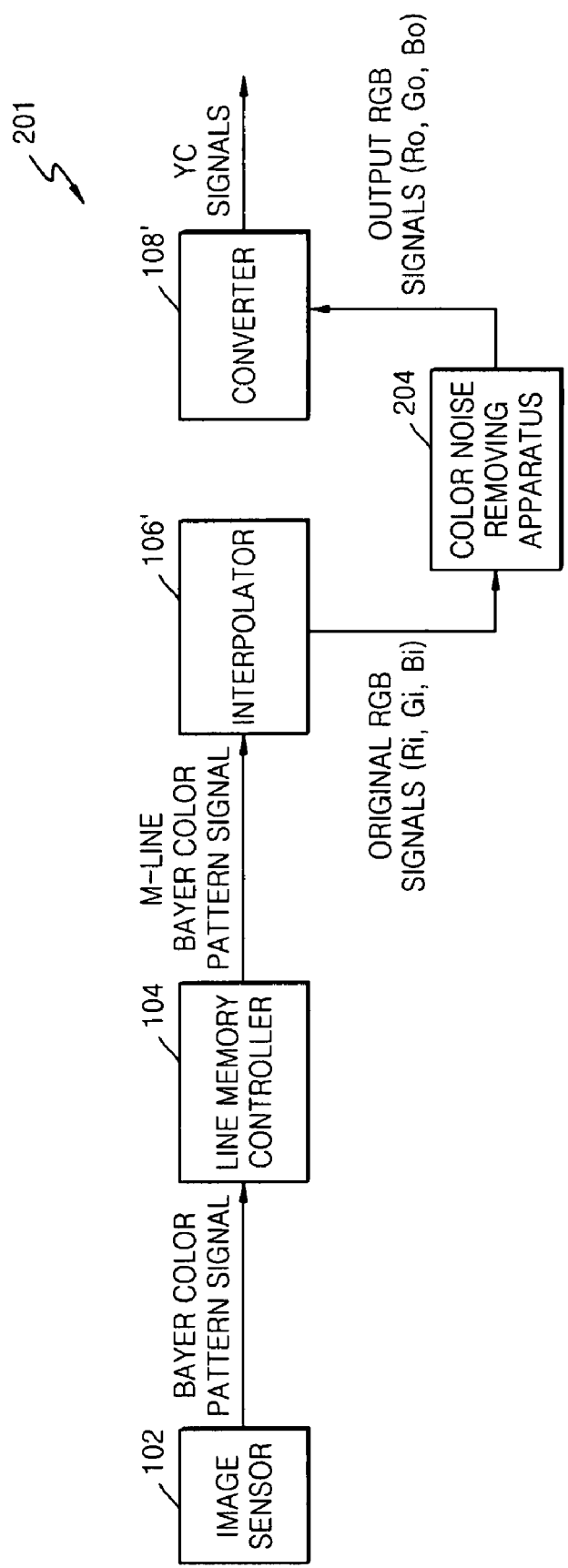
FIG. 9 shows a block diagram of an image signal processing apparatus having the color noise removing apparatus of FIG. 2A, according to an example embodiment of the present invention.

FIG. 2A is a block diagram of a color noise removing apparatus 204 according to an embodiment of the present invention. FIG. 9 is a block diagram of an image signal processing apparatus 201 including the color noise removing apparatus 204 of FIG. 2A, according to an example embodiment of the present invention.

Figure 2B:
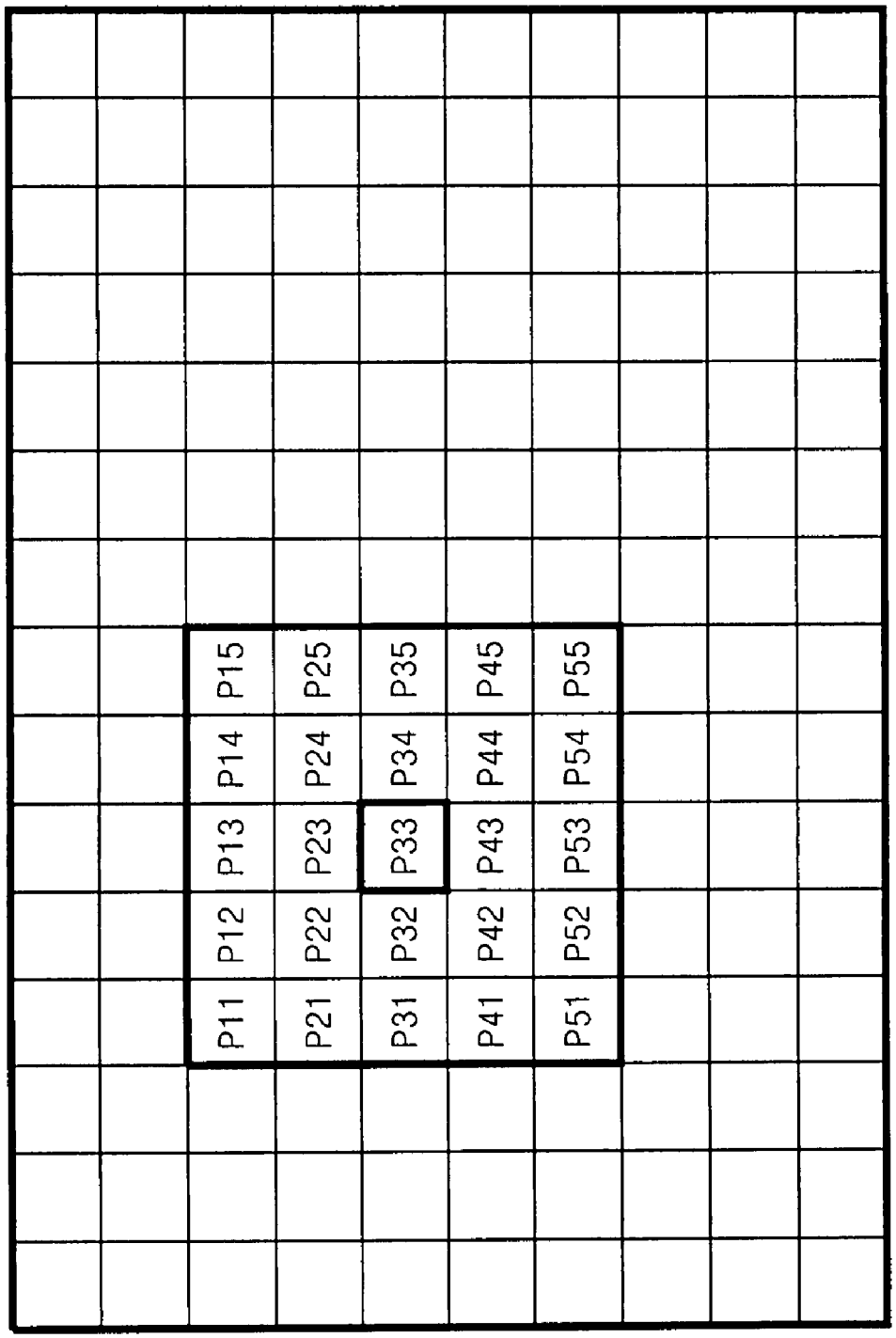
FIG. 2B illustrates example object and local pixels of a local image area, according to an example embodiment of the present invention.

FIG. 2B shows a local area of 5×5 pixels having an object pixel P33 at the center of the local area. Other pixels P11, P12, P13, P14, P15, P21, P22, P23, P24, P25, P31, P32, P34, P35, P41, P42, P43, P44, P45, P51, P52, P53, P54, and P55 surrounding the object pixel P33 in the local area form local pixels.

While FIG. 2B illustrates an example local area of 5×5 pixels, the present invention is not limited thereto. The amount of local pixels used in the present invention may be determined by the number of local pixels needed for determining whether an image corresponding to the local area belongs to an even region or an edge region and/or whether low pass filtering for removing color noise should be used for the local area pixels.

Figure 1:
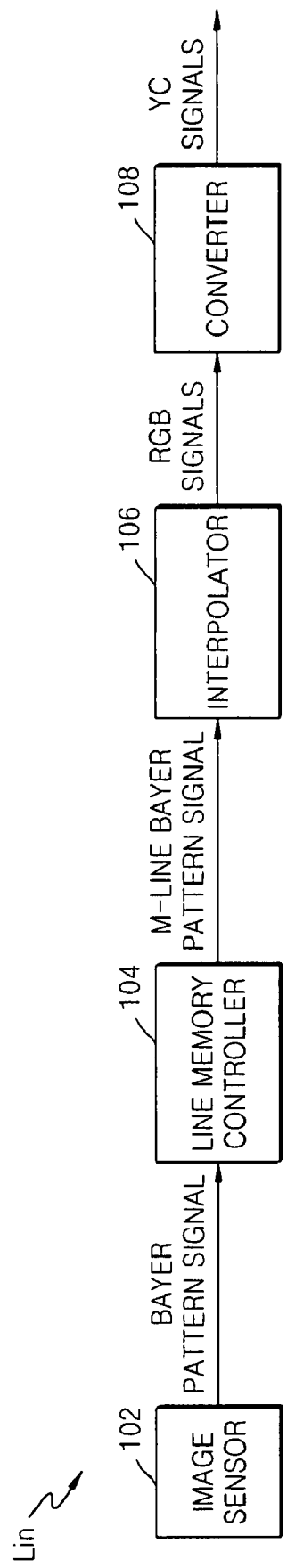
FIG. 1 is a block diagram of an image signal processor as known in the prior art.

Referring to FIG. 9, the image signal processing apparatus 201 includes an image sensor 102, a line memory controller 104, an interpolator 106', and a converter 108' that operate similarly as the same named components of FIG. 1. However in contrast to FIG. 1, the color noise removing apparatus 204 is inserted between the interpolator 106' and the converter 108' in FIG. 9.

The interpolator 106' generates respective original color component signals Ri, Gi, and Bi for each of the pixels in the local area of FIG. 2B using interpolation of the M-line Bayer color pattern signal generated from the line memory controller 104. The color noise removing apparatus 204 performs selective low pass filtering to generate respective output color component signals Ro, Go, and Bo for the original color component signals Ri, Gi, and Bi. The converter 108' uses the output color component signals Ro, Go, and Bo to generate final YC (luminance and chrominance) signals.

Referring to FIG. 2A, the color noise removing apparatus 204 includes a luminance signal generator 210, a dispersion value calculator 220, a filtering controller 230, and a low pass filtering unit 240. Each pixel Pxy of the local pixel area of FIG. 2B has a respective set of original color component signals Rxy, Gxy, and Bxy generated from the interpolator 106' in FIG. 9.

The luminance signal generator 210 generates a respective luminance signal Yxy for each of the pixels Pxy according to Equation 1 below:

$$Yxy = \frac{1}{4}Rxy + \frac{1}{2}Gxy + \frac{1}{4}Bxy \quad \text{[Equation 1]}$$

Rxy, Gxy, and Bxy are the respective original color component signals from the interpolator 106' for the corresponding pixel Pxy. Such an Equation 1 is an approximation formula such that the complexity of the hardware/software for implementing the luminance signal generator 210 may be minimized.

The dispersion value calculator 220 receives the luminance signals Yxy for all of the pixels Pxy of the local area of FIG.

2B and calculates a luminance dispersion value Yv for the object pixel P33. Furthermore, the dispersion value calculator 220 receives the original color component signals Rxy, Gxy, and Bxy for all of the pixels Pxy of the local area of FIG. 2B and calculates color dispersion values Rv, Gv and By for the object pixel P33.

Each of the dispersion values Yv, Rv, Gv and By are calculated according to Equation 2 below in an example embodiment of the present invention:

$$V(X) = \frac{1}{N} \sum_{i=1}^{N} |Xi - m| \qquad \text{[Equation 2]}$$

Here, N is 25 in the case of the 5×5 local area pixels as illustrated in FIG. 2B. In Equation 2, when V(X) represents the luminance dispersion value Yv, Xi is the respective luminance signal Yxy for each of the 25 pixels Pxy in FIG. 2B, and m is a mean value of the respective luminance signals Yxy for the 25 pixels Pxy in FIG. 2B.

When V(X) represents the red color dispersion value Rv, Xi is the respective original red color component signal Rxy from the interpolator 106' for each of the 25 pixels Pxy in FIG. 2B. In addition, m is a mean value of the respective original red color component signals Rxy for the 25 pixels Pxy.

When V(X) represents the green color dispersion value Gv, Xi is the respective original green color component signal Gxy from the interpolator 106' for each of the 25 pixels Pxy in FIG. 2B. In addition, m is a mean value of the respective original green color component signals Gxy for the 25 pixels Pxy.

When V(X) represents the blue color dispersion value Bv, Xi is the respective original blue color component signal Bxy from the interpolator 106' for each of the 25 pixels Pxy in FIG. 2B. In addition, m is a mean value of the respective original blue color component signals Bxy for the 25 pixels Pxy.

Such an Equation 2 is an approximation formula such that the complexity of the hardware/software for implementing the dispersion value calculator 220 may be minimized.

The filtering controller 230 generates a control factor K from the luminance dispersion value Yv and the color dispersion values Rv, Gv and By for the object pixel P33. The control factor K is used for controlling operation of the low pass filtering unit 240.

Figure 3A:
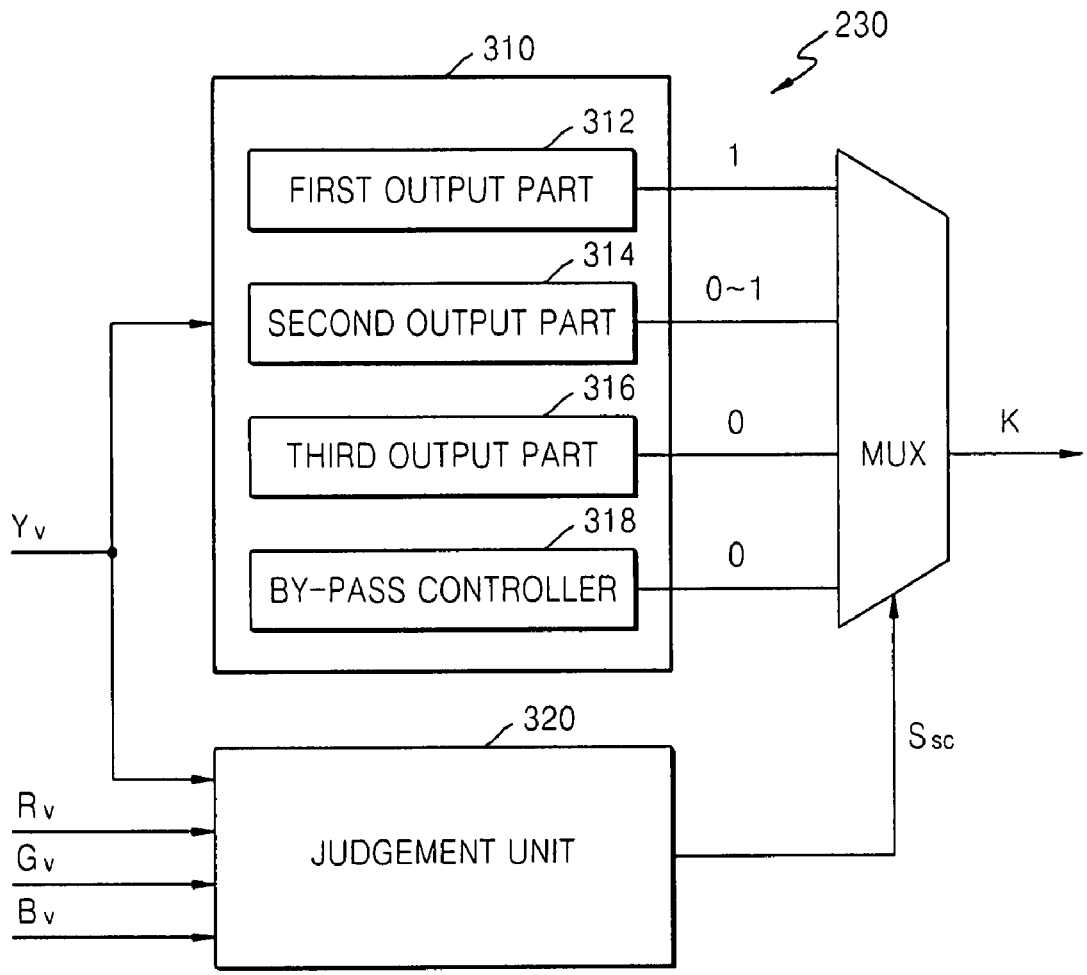
FIG. 3A is a block diagram of a filtering controller in FIG. 2A, according to an example embodiment of the present invention.

FIG. 3A shows a block diagram of the filtering controller 230 according to an example embodiment of the present invention. Referring to FIG. 3A, the filtering controller 230 includes a control factor output unit 310, a judgment unit 320, and a multiplexer MUX. The control factor output unit 310 includes first, second, and third output parts 310, 312 and 314 and a by-pass controller 318.

Figure 3B:
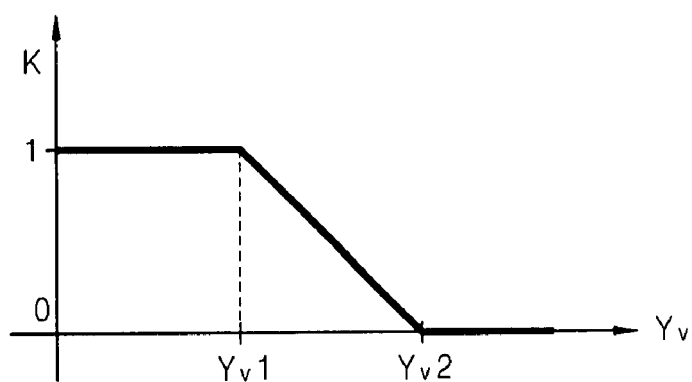
FIG. 3B illustrates determination of a control factor according to a dispersion value by the filtering controller of FIG. 3A, according to an example embodiment of the present invention.

The first output part 310 generates a first value for the control factor K (such as 1 in FIGS. 3A and 3B) for when the local area of FIG. 2B is deemed an even region. The second output part 314 generates a value that varies for the control factor K (linearly from 1 to 0 as illustrated in FIGS. 3A and 3B) for when the local area of FIG. 2B is deemed an intermediate region. The third output part 316 generates a second value for the control factor K (such as 0 in FIGS. 3A and 3B) for when the local area of FIG. 2B is deemed an edge region.

The judgment unit 320 determines whether an image area for the local pixel area of FIG. 2B is deemed an even region, an intermediate region, or an edge region from the luminance dispersion value Yv of the object pixel P33. The judgment unit 320 generates a select control signal Ssc that indicates which one of the even region, the intermediate region, or the edge region corresponds to the local pixel area of FIG. 2B. The select control signal Ssc controls the multiplexer MUX to select one of the values from the parts 312, 314, 316 and the controller 318 as the control factor K.

The judgment unit 320 uses the Yv versus K graph of FIG. 3B for determining which one of the even region, the intermediate region, or the edge region corresponds to the local pixel area of FIG. 2B. Referring to FIG. 3B, when the luminance dispersion value Yv for the object pixel P33 is less than a first reference value Yv1, the local pixel area of FIG. 2B corresponds to the even region, and the control factor K is set by the MUX to the first value "1" from the first output part 312.

Alternatively, when the luminance dispersion value Yv for the object pixel P33 is greater than a second reference value Yv2, the local pixel area of FIG. 2B corresponds to the edge region, and the control factor K is set by the MUX to the second value "0" from the third output part 316. In addition, when the luminance dispersion value Yv for the object pixel P33 is in the range of the first reference value Yv1 to the second reference value Yv2, the local pixel area of FIG. 2B corresponds to the intermediate region, and the control factor K generated by the MUX varies linearly with the luminance dispersion value Yv from the first value "1" to the second value "0" as generated from the second output part 314.

Referring to FIG. 3A, the control factor output unit 310 includes the by-pass controller 318 that outputs a by-pass control factor (0 in FIG. 3A) to the MUX. When each of all the color dispersion values Rv, Gv and By is less than the luminance dispersion value Yv for the object pixel P33, the judgment unit 320 controls the MUX to output the by-pass control factor. When the control factor K is the by-pass control factor, the original color signals Ri, Gi and Bi do not include color noise. In that case, the low pass filtering unit 240 outputs the original color component signals Ri, Gi and Bi as the output color component signals Ro, Go and Bo without any low pass filtering.

The low pass filtering unit 240 low-pass-filters the original color component signals Ri, Gi and Bi of the object pixel P33 in response to the control factor K from the MUX to generate the output color component signals Ro, Go and Bo of the object pixel P33. For example, the low pass filter 240 performs low pass filtering using the control factor K as a weight of a filter coefficient when the low pass filtering unit 240 is configured as illustrated in FIG. 4.

Figure 4:
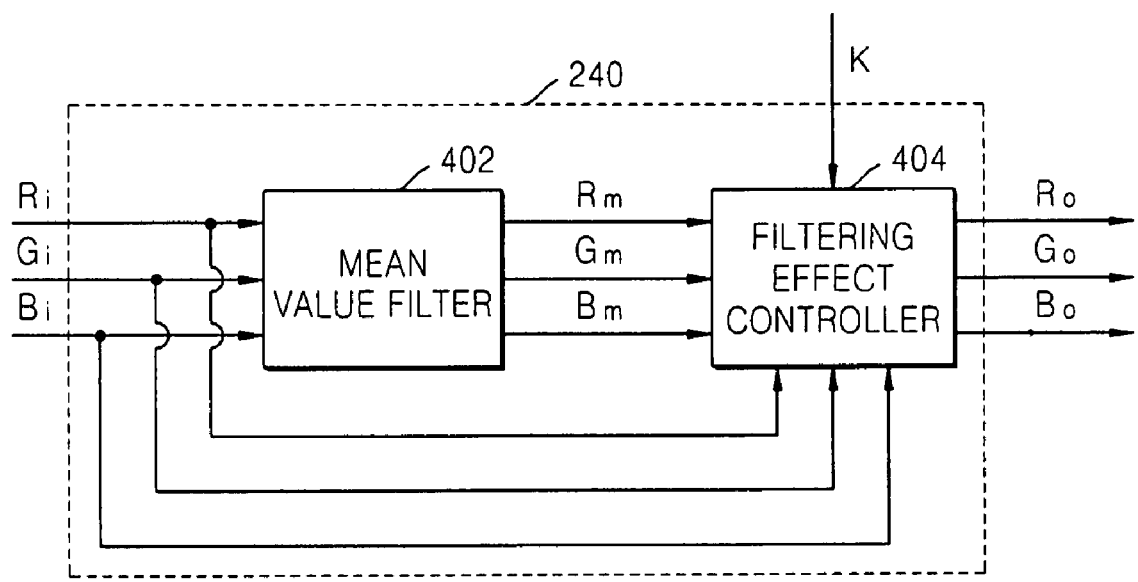
FIG. 4 is a block diagram of a low pass filtering unit in FIG. 2A, according to an example embodiment of the present invention.

FIG. 4 is a block diagram of the low pass filtering unit 240 of FIG. 2A according to an example embodiment of the present invention. Referring to FIG. 4, the low pass filtering unit 240 includes a mean value filter 402 and a filtering effect controller 404. The mean value filter 402 receives a respective set of original color components Rxy, Gxy, and Bxy for each of the local area pixels Pxy in FIG. 2B to calculate mean color component signals Rm, Gm, and Bm.

Rm is a mean of the red color component signals Rxy for the 25 pixels Pxy of the 5×5 local pixel area of FIG. 2B. Gm is a mean of the green color component signals Gxy for the 25 pixels Pxy of the 5×5 local pixel area of FIG. 2B. Bm is a mean of the blue color component signals Bxy for the 25 pixels Pxy of the 5×5 local pixel area of FIG. 2B.

The filtering effect controller 404 generates the output color component signals Ro, Go and Bo for the object pixel P33 from the original color component signals Ri, Gi and Bi of the object pixel P33, the mean color component signals Rm, Gm and Bm, and the control factor K according to the following Equations 3:

$$Ro=(Rm-Ri)\cdot K+Ri=Rm\cdot K+Ri\cdot(1-K)$$

$$Go=(Gm-Gi)\cdot K+Gi=Gm\cdot K+Gi\cdot(1-K)$$

$$Bo=(Bm-Bi)\cdot K+Bi=Bm\cdot K+Bi\cdot(1-K) \quad \text{[Equations 3]}$$

Equations 3 become Equations 4 below for strong low pass filtering in the case of the even region because the control factor K is 1:

$$Ro=Rm$$

$$Go=Gm$$

$$Bo=Bm \quad \text{[Equations 4]}$$

In the case of the edge region, Equations 3 become Equations 5 below for substantially no low pass filtering because the control factor K is 0.

$$Ro=Ri$$

$$Go=Gi$$

$$Bo=Bi \quad \text{[Equations 5]}$$

When each of all the color dispersion values Rv, Gv and Bv for the object pixel P33 is less than the luminance dispersion value Yv for the object pixel P33, Equations 3 become Equations 5 for substantially no low pass filtering because the control factor K is set to the by-pass control factor of 0. In the case of the intermediate region, Equations 3 are used for determining Ro, Go, and Bo for a graduated amount of low pass filtering depending on the luminance dispersion value Yv.

Figure 5:
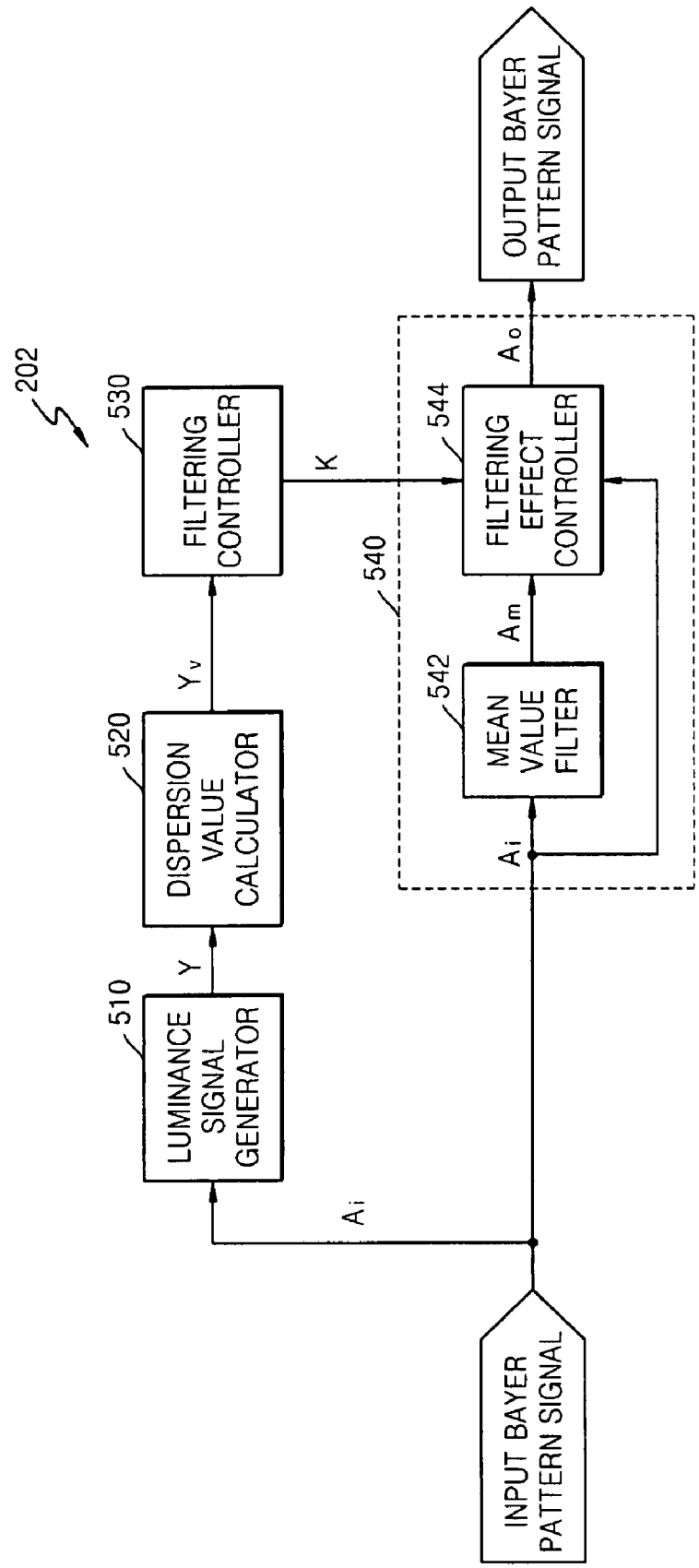
FIG. 5 is a block diagram of a color noise removing apparatus in an image signal processor of FIG. 8, according to another example embodiment of the present invention.
Figure 8:
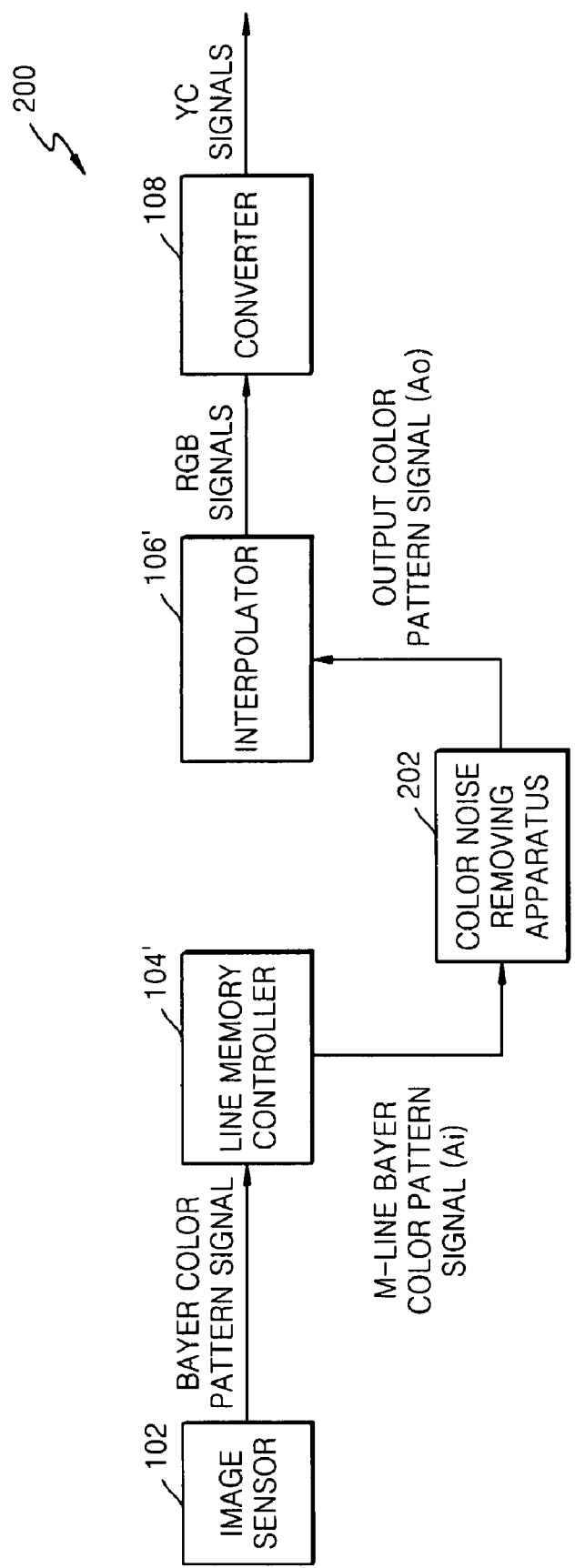
FIG. 8 shows a block diagram of an image signal processing apparatus having the color noise removing apparatus of FIG. 5, according to an example embodiment of the present invention.

FIG. 5 is a block diagram of a color noise removing apparatus 202 according to another embodiment of the present invention. FIG. 8 is a block diagram of an image signal processing apparatus 200 including the color noise removing apparatus 202 of FIG. 5, according to such an embodiment of the present invention.

FIGS. 5 and 8 are for the case where color noise is removed from the Bayer color pattern signal. Referring to FIG. 8, the image signal processing apparatus 200 includes an image sensor 102, a line memory controller 104', an interpolator 106', and a converter 108 that operate similarly as the same named components of FIG. 1. However in contrast to FIG. 1, the color noise removing apparatus 202 of FIG. 5 is inserted between the line memory controller 104' and the interpolator 106' in FIG. 8.

The line memory controller 104' generates an M-line Bayer color pattern signal (Ai) for the pixels in the local area of FIG. 2B. The color noise removing apparatus 202 performs selective low pass filtering on such a Bayer color pattern signal Ai to generate an output color pattern signal Ao. The interpolator 106' in FIG. 8 uses the output color pattern signal Ao to generate respective color component RGB signals.

Referring to FIG. 5, the color noise removing apparatus 202 includes a luminance signal generator 510, a dispersion value calculator 520, a filtering controller 530, and a low pass filtering unit 540. The low pass filtering unit 540 includes a mean value filter 542 and a filtering effect controller 544.

The operation of the color noise removing apparatus 202 of FIG. 5 is similar to that of the color noise removing apparatus 204 of FIG. 2A except that the signal processed in FIG. 5 is the Bayer color pattern signal Ai from the line memory controller 104' in FIG. 8.

The luminance signal generator 510 generates a respective luminance signal Yxy for each of the 25 pixels Pxy in the local pixel area of FIG. 2B from the Bayer color pattern signal Ai.

The operation of generating the luminance signals Yxy from the Bayer color pattern signal Ai is now explained with reference to FIGS. 6(a), 6(b), and 6(c).

FIG. 6(a) illustrates a Bayer color pattern for the 5×5 local pixel area of FIG. 2B for the case that the object pixel P33 is for a G signal. FIG. 6(b) illustrates the case that the object pixel P33 is for an R signal, and FIG. 6(c) illustrates the case that the object pixel P33 is for a B signal. The luminance signal generator 510 generates the luminance signals Yxy for each of the 5×5 pixels Pxy in FIG. 2B with each such pixel being the object pixel Pxy, using Equation 6 below:

$$Yxy = \frac{1}{4}Rxy + \frac{1}{2}Gxy + \frac{1}{4}Bxy \quad \text{[Equation 6]}$$

Here, Yxy represents a respective luminance signal value, Rxy represents a respective R signal value, Gxy represents a respective G signal value, and Bxy represents a respective B signal value, for each of the 25 pixels Pxy in the 5×5 local pixel area. That is, the luminance signal generator 510 outputs a respective luminance signal Yxy for each of the 25 local area pixels Pxy.

When the input Bayer pattern signal corresponding to the example object pixel P33 is a G signal as illustrated in FIG. 6(a), the R1 signal for the pixel P32 and the R2 signal for the pixel P34 in FIG. 6(a) are averaged to obtain the Rxy signal. Also in that case, the G1 signal for the pixel P33 is the Gxy signal. Further in that case, the B1 signal for the pixel P23 and the B2 signal for the pixel P43 in FIG. 6(a) are averaged to obtain the Bxy signal. Such signals Rxy, Gxy, and Bxy are used in Equation 6 above to obtain the luminance signal Yxy corresponding to the object pixel P33.

When the input Bayer pattern signal corresponding to the example object pixel P33 is an R signal as illustrated in FIG. 6(b), the R1 signal for the pixel P33 is the Rxy signal. Also in that case, the G1 signal for the pixel P23, the G2 signal for the pixel P43, the G3 signal for the pixel P32, and the G4 signal for the pixel P34 are averaged to obtain the Gxy signal. Further in that case, the B1 signal for the pixel P22, the B2 signal for the pixel P42, the B3 signal for the pixel P44, and the B4 signal for the pixel P24 are averaged to obtain the Bxy signal. Such Rxy, Gxy, and Bxy signals are used in Equation 6 above to obtain the luminance signal Yxy corresponding to the object pixel P33.

When the input Bayer pattern signal corresponding to the example object pixel P33 is a B signal as illustrated in FIG. 6(c), the R1 signal for the pixel P22, the R2 signal for the pixel P42, the R3 signal for the pixel P44, and the R4 signal for the pixel P24 are averaged to obtain the Rxy signal. Also in that case, the G1 signal for the pixel P23, the G2 signal for the pixel P43, the G3 signal for the pixel P32, and the G4 signal for the pixel P34 are averaged to obtain the Gxy signal, and the B1 signal for the pixel P33 is the Bxy signal. Such Rxy, Gxy, and Bxy signals are used in Equation 6 above to obtain the luminance signal Yxy corresponding to the object pixel P33.

A respective 5×5 local pixel area is formed for each labeled pixel Pxy of FIG. 2B forming a respective object pixel. Then, the respective luminance signal Yxy is generated for each of such pixel Pxy as just described above with such a pixel being the respective object pixel in the respective 5×5 local area.

The dispersion value calculator 520 calculates a luminance dispersion value Yv for the object pixel P33 from the luminance signals Yxy for the 25 labeled pixels Pxy of FIG. 2B using the approximation formula of Equation 2 above. The filtering controller 530 generate a control factor K based on the luminance dispersion value Yv of the object pixel P33, similarly as described already in reference to FIGS. 3A and 3B.

The selected control factor K is sent to the filtering effect controller 544. The low pass filtering unit 540 low-pass-filters the image signals corresponding to the local area pixels Pxy labeled in FIG. 2B in response to the selected control factor K to generate an output Bayer color pattern signal Ao corresponding to the filtered image.

As illustrated in FIG. 5, the low pass filtering unit 540 includes the mean value filter 542 and the filtering effect controller 544. The mean value filter 542 receives and determines a mean signal Am for the object pixel P33 from the Bayer color pattern signals Ai corresponding to the 5×5 labeled local area pixels Pxy in FIG. 2B. The filtering effect controller 544 outputs the output Bayer color pattern signal Ao for the object pixel P33 based on the original Bayer color pattern signal Ai for the object pixel P33, the mean signal Am for the object pixel P33, and the selected control factor K.

The operation of calculating the mean signal Am for the object pixel P33 is now described with reference to FIGS. 7(a), 7(b) and 7(c). FIG. 7(a) illustrates the case where the Bayer color pattern signal Ai for the object pixel P33 is a G signal. FIG. 7(b) illustrates the case where the Bayer color pattern signal Ai for the object pixel P33 is an R signal. FIG. 7(c) illustrates the case where the Bayer color pattern signal Ai for the object pixel B33 is a B signal.

For the case of FIG. 7(a), the G signals for pixels P11, P13, P22, P24, P31, P33, P35, P42, P44, P51, P53 and P55 are averaged to obtain the mean signal Am for the object pixel P33. For the case of FIG. 7(b), the R signals for pixels P11, P13, P15, P31, P33, P35, P51, P53 and P55 are averaged to obtain the mean signal Am for the object pixel P33. For the case of FIG. 7(c), the B signals for the pixels P11, P13, P15, P31, P33, P35, P51, P53 and P55 are averaged to obtain the mean signal Am for the object pixel P33.

In an example embodiment of the present invention, the filtering effect controller 544 generates the output Bayer color pattern signal Ao for the object pixel P33 according to Equation 7 below:

$$Ao=(Am-Ai)\cdot K+Ai=Am\cdot K+Ai\cdot(1-K)$$ [Equation 7]

The selected control factor K is set to 1 when the image area corresponding to the local area pixels of FIG. 2B are for the even region, to a value that is graduated between 0 and 1 depending on the luminance dispersion value Yv when such an image area is for the intermediate region, and to 0 when the image area is for the edge region. Thus, the present invention selectively removes color noise from the image area depending on whether the image area is for an even region, an edge region, or an intermediate region.

While the present invention has been particularly shown and described with reference to exemplary embodiments thereof, it will be understood by those of ordinary skill in the art that various changes in form and details may be made therein without departing from the spirit and scope of the present invention as defined by the following claims.

For example, the term "signal" has been used herein to broadly include the case of such a signal being represented as a value. Thus, the term "value" herein is for the case where the signal is represented as a value. For example, the signals Yxy, Yv, Ri, Gi, Bi, Rv, Gv, By, Ro, Go, Bo, Rm, Gm, Bm, Ai, Am, and Ao may each be a respective value.

Figure 10:
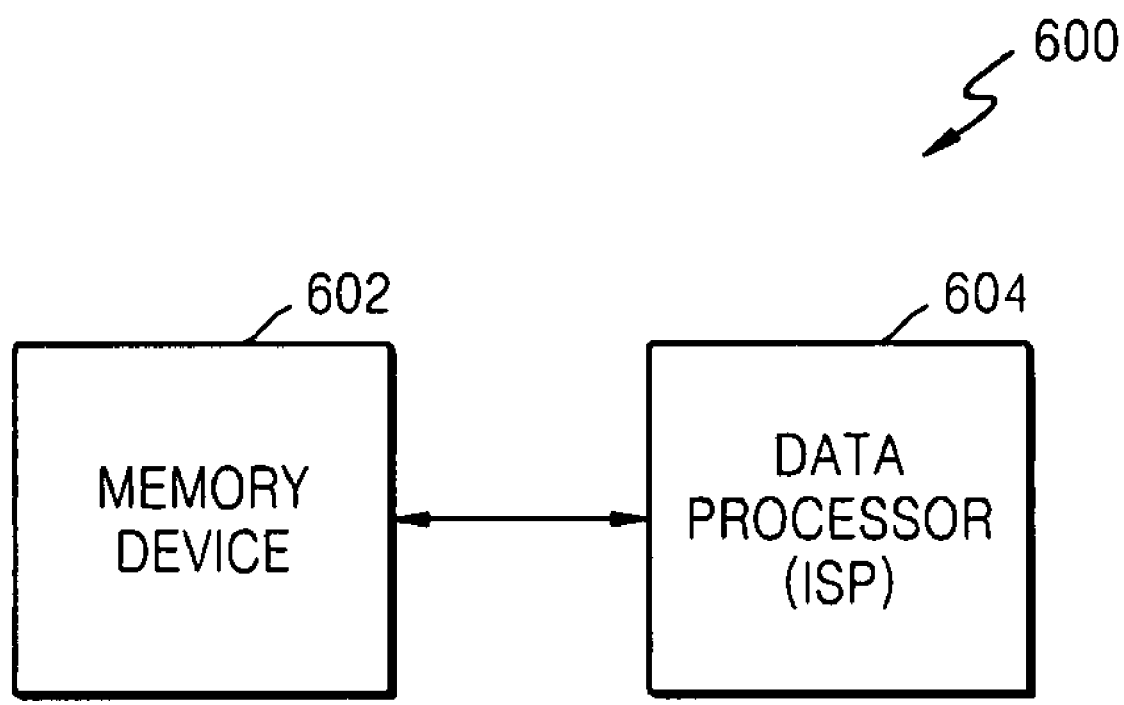
FIG. 10 shows a block diagram for implementing components of FIGS. 2A, 3A, 4, 5, 8 and 9, according to an example embodiment of the present invention.

In addition, any of the components of FIGS. 2A, 3A, 4, 5, 8, and 9 may be implemented in hardware circuitry or by software programming. For example, the components of FIGS. 2A, 3A, 4, 5, 8, and 9 may be implemented as part of an ISP (image signal processor) 600 of FIG. 10 including a memory device 602 and a data processor 604. In that case, the memory device 602 stores sequences of instructions (i.e. software), and execution of such sequences of instructions by the data processor 604 causes the data processor to perform the steps attributed to the components of FIGS. 2A, 3A, 4, 5, 8, and 9 herein.

The present invention is limited only as defined in the following claims and equivalents thereof.

What is claimed is:

1. A method of processing an image signal, comprising:
generating luminance signals for an object pixel and local pixels;
generating a luminance dispersion value for the object pixel from the luminance signals of the object and local pixels;
determining a control factor depending on the luminance dispersion value; and
low-pass filtering at least one image signal of the object pixel according to the control factor.

2. The method of claim 1, wherein the luminance dispersion value is represented by:

$$V(X) = \frac{1}{N}\sum_{i=1}^{N} |Xi - m|$$

with N being a total number of the object and local pixels, Xi being a respective luminance value for each of the object and local pixels, and m being a mean value of the respective luminance values for the object and local pixels.

3. The method of claim 1, wherein the control factor is a first value if the luminance dispersion value is less than a first reference value, is a second value if the luminance dispersion value is greater than a second reference value, and varies linearly with the luminance dispersion value in a range of the first and second reference values.

4. The method of claim 3, wherein a plurality of original color component signals Ri, Gi, and Bi for the object pixel are low-pass filtered to generate output color component signals Ro, Go, and Bo according to the control factor K as follows:

$$Ro=(Rm-Ri)\cdot K+Ri=Rm\cdot K+Ri\cdot(1-K);$$

$$Go=(Gm-Gi)\cdot K+Gi=Gm\cdot K+Gi\cdot(1-K);$$

$$Bo=(Bm-Bi)\cdot K+Bi=Bm\cdot K+Bi(1-K).$$

with Rm, Gm, and Bm being mean color component signals for the object pixel.

5. The method of claim 4, wherein the plurality original color component signals Ri, Gi, and Bi are generated from an interpolator that processes a Bayer color pattern signal, and wherein the plurality of the output color component signals Ro, Go, and Bo are used by a converter for generating final YC (luminance and chrominance) signals.

6. The method of claim 3, wherein a color pattern signal Ai for the object pixel is low-pass filtered to generate an output color pattern signal Ao according to the control factor K as follows:

$$Ao=(Am-Ai)\cdot K+Ai=Am\cdot K+Ai\cdot(1-K)$$

with Am being a mean color pattern signal for the object pixel.

7. The method of claim 6, wherein the color pattern signal Ai is a Bayer color pattern signal from a line memory controller, and wherein the output color pattern signal Ao is used by an interpolator to generate color component signals for the object pixel.

8. The method of claim 1, further comprising:

generating color dispersion values for the object pixel from color component signals of the object and local pixels; and determining the control factor depending on the luminance dispersion value and the color dispersion values.

9. The method of claim 8, further comprising:

setting the control factor to a by-pass value when all of the color dispersion values are less than the luminance dispersion value.

10. The method of claim 1, wherein the object pixel is disposed at a center of a local area of 5×5 pixels, and wherein the local pixels are pixels surrounding the object pixel in the local area.

11. An apparatus for processing an image signal, comprising:

a luminance signal generator for generating luminance signals for an object pixel and local pixels;

a dispersion value calculator for generating a luminance dispersion value for the object pixel from the luminance signals of the object and local pixels;

a filtering controller for determining a control factor depending on the luminance dispersion value; and a low pass filtering unit for low-pass filtering at least one image signal of the object pixel according to the control factor.

12. The apparatus of claim 11, wherein the dispersion value calculator calculates the luminance dispersion value as follows:

$$V(X) = \frac{1}{N} \sum_{i=1}^{N} |Xi - m|$$

with N being a total number of the object and local pixels, Xi being a respective luminance value for each of the object and local pixels, and m being a mean value of the respective luminance values for the object and local pixels.

13. The apparatus of claim 11, wherein the filtering controller determines the control factor as a first value if the luminance dispersion value is less than a first reference value, as a second value if the luminance dispersion value is greater than a second reference value, and according to a linear variation with the luminance dispersion value in a range of the first and second reference values.

14. The apparatus of claim 13, wherein a plurality of original color component signals Ri, Gi, and Bi for the object pixel are low-pass filtered, and wherein the low pass filtering unit includes:

a mean value filter for generating mean color component signals Rm, Gm, and Bm; and a filtering effect controller that generates output color component signals Ro, Go, and Bo according to the control factor K as follows:

$Ro=(Rm-Ri) \cdot K+Ri=Rm \cdot K+Ri \cdot (1-K);$ $Go=(Gm-Gi) \cdot K+Gi=Gm \cdot K+Gi \cdot (1-K);$ $Bo=(Bm-Bi) \cdot K+Bi=Bm \cdot K+Bi \cdot (1-K).$ 15. The apparatus of claim 14, further comprising:

an interpolator that generates the plurality of original color component signals Ri, Gi, and Bi from processing a Bayer color pattern signal; and a converter that uses the plurality of the output color component signals Ro, Go, and Bo to generate final YC (luminance and chrominance) signals.

16. The apparatus of claim 13, wherein a color pattern signal Ai for the object pixel is low-pass filtered, and wherein the low pass filtering unit includes:

a mean value filter for generating a mean color pattern signal Am; and a filtering effect controller that generates an output color pattern signal Ao according to the control factor K as follows:

$Ao=(Am-Ai) \cdot K+Ai=Am \cdot K+Ai \cdot (1-K).$

17. The apparatus of claim 16, further comprising:

a line memory controller for generating the color pattern signal Ai that is a Bayer color pattern signal; and an interpolator that uses the output color pattern signal Ao for generating color component signals of the object pixel.

18. The apparatus of claim 11, wherein the dispersion value calculator calculates color dispersion values for the object pixel from color component signals of the object and local pixels, and wherein the filtering controller determines the control factor depending on the luminance dispersion value and the color dispersion values.

19. The apparatus of claim 18, wherein the filtering controller sets the control factor to a by-pass value when all of the color dispersion values are less than the luminance dispersion value.

20. The apparatus of claim 11, wherein the object pixel is disposed at a center of a local area of 5×5 pixels, and wherein the local pixels are pixels surrounding the object pixel in the local area.

* * * * *